US008437031B2

(12) United States Patent
Hasegawa

(10) Patent No.: US 8,437,031 B2
(45) Date of Patent: May 7, 2013

(54) IMAGE PROCESSING DEVICE AND METHOD FOR REDUCING AN ORIGINAL IMAGE

(75) Inventor: Tomohiko Hasegawa, Aichi-ken (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1613 days.

(21) Appl. No.: 11/848,692

(22) Filed: Aug. 31, 2007

(65) Prior Publication Data
US 2008/0056587 A1    Mar. 6, 2008

(30) Foreign Application Priority Data

Aug. 31, 2006  (JP) .................................. 2006-235496
Aug. 31, 2006  (JP) .................................. 2006-235808
Aug. 31, 2006  (JP) .................................. 2006-235823

(51) Int. Cl.
G06K 15/02  (2006.01)
G06K 9/00   (2006.01)
G06K 9/40   (2006.01)
G06K 9/38   (2006.01)
G06F 15/00  (2006.01)
H03F 3/08   (2006.01)
H04N 1/46   (2006.01)

(52) U.S. Cl.
USPC ............. 358/1.2; 358/1.9; 358/518; 358/519; 358/525; 382/162; 382/167; 382/168; 382/271; 382/272; 382/274; 382/260; 382/264; 382/275

(58) Field of Classification Search ........................ None
See application file for complete search history.

(56) References Cited

U.S. PATENT DOCUMENTS 6,304,294 B1   10/2001   Tao et al.
6,658,158 B2   12/2003   Fukuhara et al.
(Continued)

FOREIGN PATENT DOCUMENTS

JP   2000-197052   7/2000
JP   2001-69525    3/2001
(Continued)

OTHER PUBLICATIONS

Japanese Official Action dated Sep. 14, 2010 together with a partial English language translation.
(Continued)

Primary Examiner — Hilina S Kassa
(74) Attorney, Agent, or Firm — Scully, Scott, Murphy & Presser, P.C.

(57) ABSTRACT

An image processor includes a reduced image forming unit, a first reflectance value calculating unit, a normalizing parameter determining unit, a second reflectance value calculating unit, a normalizing unit, a correcting unit, and a reducing information determining unit. The reduced image forming unit reduces an original image to form a reduced image. The first reflectance value calculating unit calculates a first reflectance value for each reduced pixel. The normalizing parameter determining unit determines a normalizing parameter based on a distribution of the first reflectance values. The second reflectance value calculating unit calculates a second reflectance value for each original pixel. The normalizing unit normalizes the second reflectance values based on the normalizing parameter to obtain normalized Retinex values. The correcting unit corrects the original pixel values based on the normalized Retinex values. The reducing information determining unit determines first information based on second information with respect to at least one of quality of the corrected original image to be formed, a type of a recording medium on which the corrected original image is formed, a size of a recording medium on which the corrected original image is formed, the reduced image size, and the original image size. The reduced image forming unit reduces the original image based on the first information.

23 Claims, 11 Drawing Sheets

U.S. PATENT DOCUMENTS

| | | | |
|---|---|---|---|
| 6,741,753 B1 | 5/2004 | Moroney | |
| 6,834,125 B2 | 12/2004 | Woodell et al. | |
| 6,842,543 B2 | 1/2005 | Woodell et al. | |
| 6,885,482 B1 * | 4/2005 | Kubo et al. | 358/518 |
| 6,941,028 B2 | 9/2005 | Kimmel et al. | |
| 6,947,176 B1 | 9/2005 | Kubo et al. | |
| 7,251,056 B2 | 7/2007 | Matsushima | |
| 7,298,917 B2 * | 11/2007 | Sakatani et al. | 382/254 |
| 7,508,550 B2 | 3/2009 | Kameyama | |
| 7,548,258 B2 * | 6/2009 | Kaplinsky | 348/211.99 |
| 7,570,390 B2 * | 8/2009 | Mitsunaga | 358/1.9 |
| 7,683,948 B2 * | 3/2010 | Yanof et al. | 348/246 |
| 7,697,784 B2 * | 4/2010 | Izumi | 382/275 |
| 7,760,943 B2 * | 7/2010 | Shaked | 382/174 |
| 7,876,474 B2 * | 1/2011 | Kondo | 358/1.9 |
| 7,885,479 B2 * | 2/2011 | Kuno | 382/276 |
| 7,912,308 B2 * | 3/2011 | Kuno | 382/254 |
| 7,920,752 B2 * | 4/2011 | Kuno | 382/254 |
| 8,081,831 B2 * | 12/2011 | Hasegawa | 382/254 |
| 8,081,839 B2 * | 12/2011 | Hasegawa | 382/274 |
| 8,165,418 B2 * | 4/2012 | Hasegawa | 382/274 |
| 2002/0131652 A1 * | 9/2002 | Yoda | 382/309 |
| 2003/0012448 A1 * | 1/2003 | Kimmel et al. | 382/274 |
| 2003/0026494 A1 * | 2/2003 | Woodell et al. | 382/260 |
| 2003/0071923 A1 * | 4/2003 | Eskin | 348/674 |
| 2003/0072496 A1 * | 4/2003 | Woodell et al. | 382/260 |
| 2004/0052414 A1 * | 3/2004 | Schroder | 382/167 |
| 2004/0091164 A1 * | 5/2004 | Sakatani et al. | 382/254 |
| 2005/0013506 A1 * | 1/2005 | Yano | 382/274 |
| 2005/0074163 A1 | 4/2005 | Shaked | |
| 2005/0134711 A1 * | 6/2005 | Hori | 348/254 |
| 2005/0226526 A1 * | 10/2005 | Mitsunaga | 382/274 |
| 2006/0062562 A1 | 3/2006 | Utagawa | |
| 2006/0221226 A1 * | 10/2006 | Yanof et al. | 348/346 |
| 2007/0040914 A1 * | 2/2007 | Katagiri et al. | 348/221.1 |
| 2007/0296989 A1 * | 12/2007 | Nakajima et al. | 358/1.9 |
| 2008/0107333 A1 * | 5/2008 | Mazinani et al. | 382/167 |

FOREIGN PATENT DOCUMENTS

| | | |
|---|---|---|
| JP | 2001-78025 | 3/2001 |
| JP | 2002-281347 | 9/2002 |
| JP | 2003-69822 | 3/2003 |
| JP | 2003-219182 | 7/2003 |
| JP | 2003-333331 | 11/2003 |
| JP | 2004-165840 | 6/2004 |
| JP | 3731577 | 10/2005 |
| JP | 2006-114005 | 4/2006 |

OTHER PUBLICATIONS

Meylan et al., "Color image enhancement using a Retinex-based adaptive filter", Proc. IS&T Second European Conference on Color in Graphics, Image, and Vision (CGIV 2004), vol. 2, pp. 359-363.

U.S. Official Action dated Mar. 22, 2011 from related U.S. Appl. No. 11/848,563.

Jobson et al., "A Multiscale Retinex for Bridging the Gap Between Color Images and the Human Observation of Scenes", IEEE Transaction of Image Processing, vol. 6, No. 7, Jul. 1997, pp. 965-976.

Hines et al., "DSP Implementation of the Retinex Image Enhancement Algorithm", Proceedings of the SPIE Visual Information Processing XIII, vol. 5348 (2004), pp. 13-24.

U.S. Official Action dated Mar. 10, 2011 from related U.S. Appl. No. 11/864,251.

Notice of Allowance dated Aug. 19, 2011 from related U.S. Appl. No. 11/864,251.

Japanese Decision of Rejection dated Feb. 22, 2011 together with partial English language translation from Japanese application 2006-235823.

Japanese Official Action dated Nov. 24, 2010 together with a English language translation.

U.S. Official Action dated Jun. 23, 2011 from related U.S. Appl. No. 12/057,838.

* cited by examiner

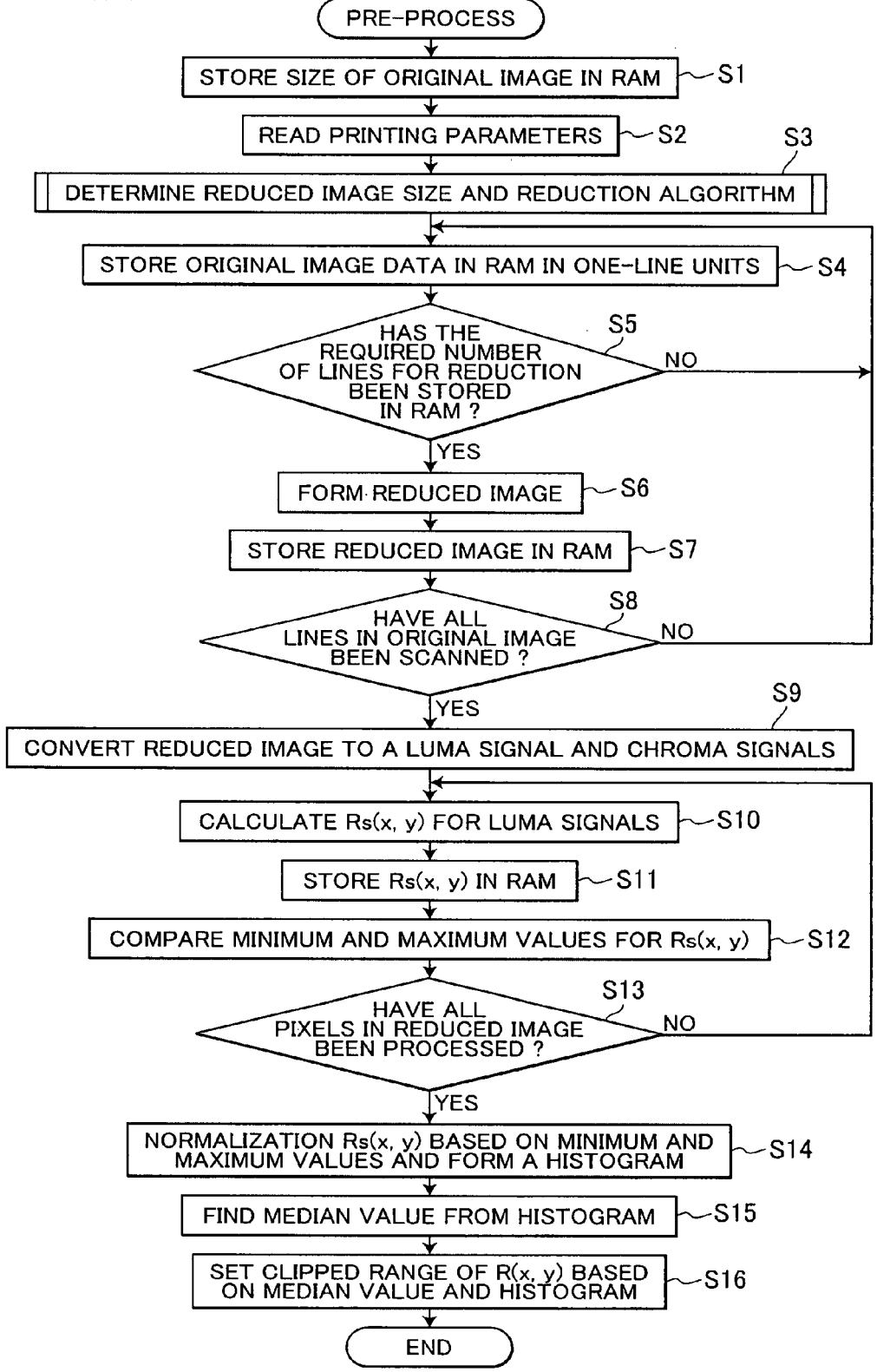

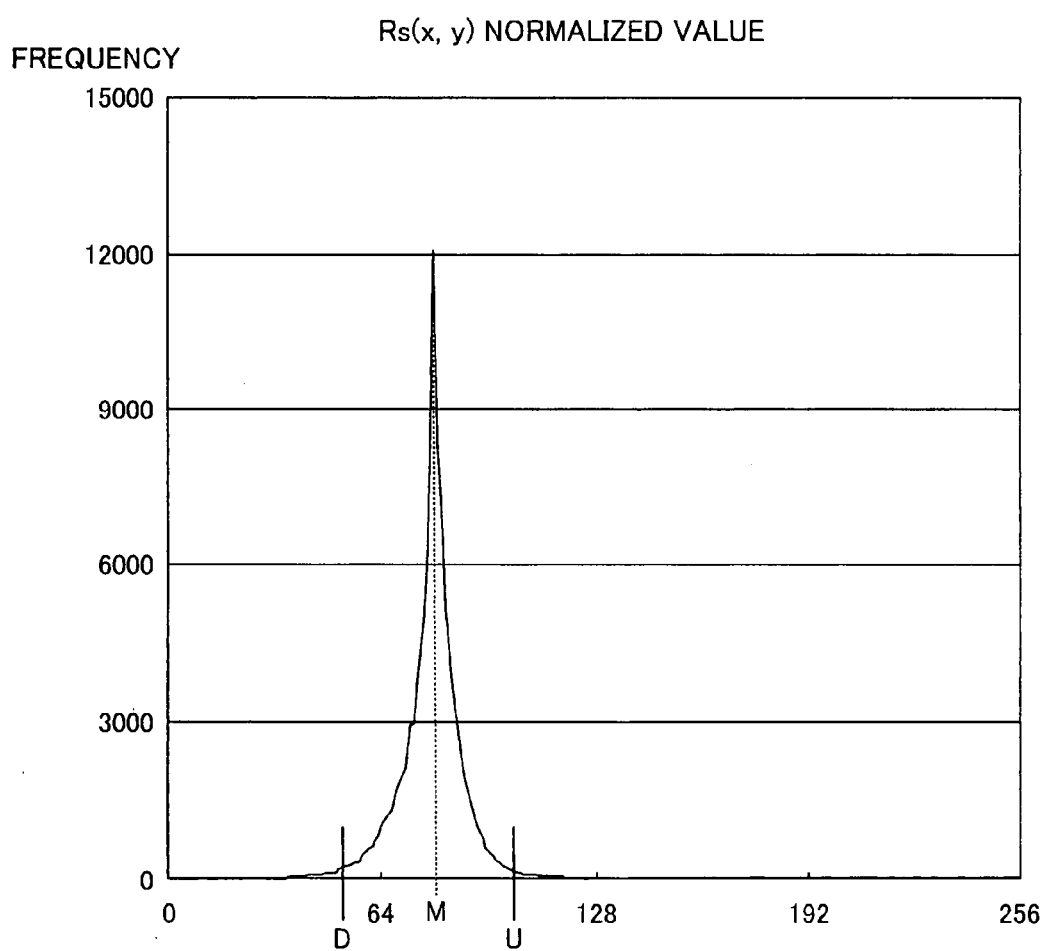

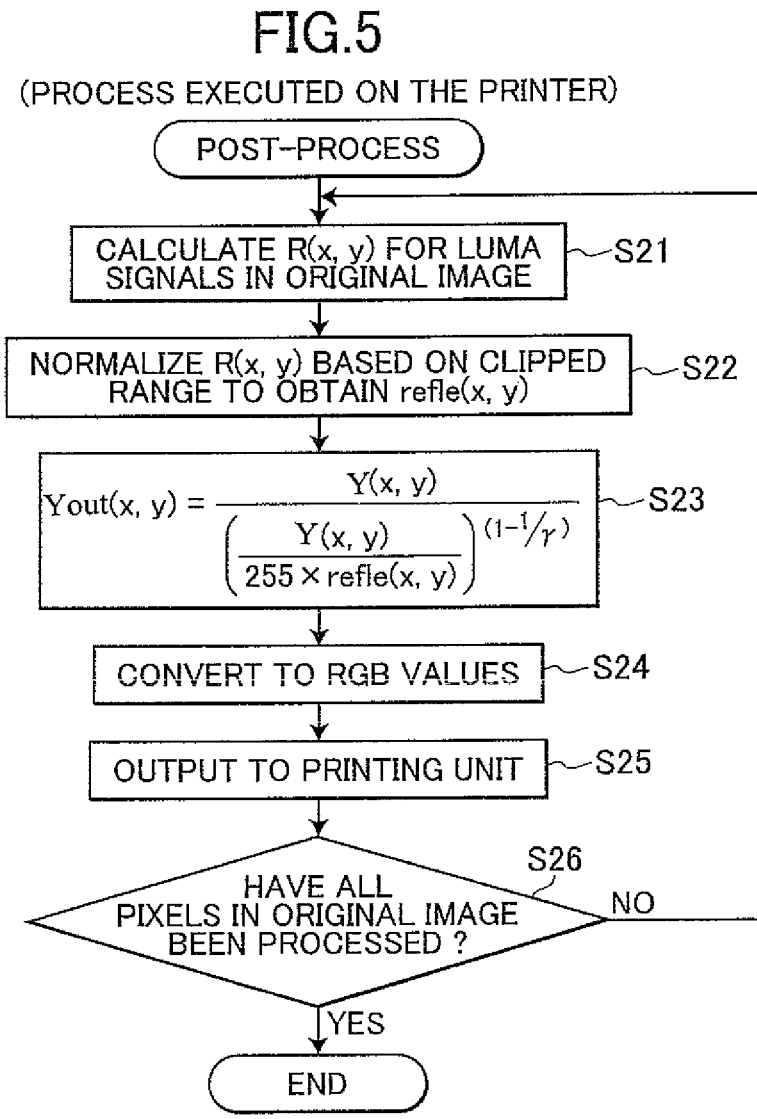

FIG.6

TABLE FOR PHOTO MODE

| PRINT MODE | PAPER TYPE | PAPER SIZE | ORIGINAL IMAGE SIZE | REDUCED IMAGE SIZE | REDUCTION ALGORITHM |
|---|---|---|---|---|---|
| PHOTO MODE | GLOSSY PAPER | 4″ × 6″ | 600 × 800[pixel] | 150 × 200[pixel] | ME |
| | | | 1200 × 1600[pixel] | 300 × 400[pixel] | ME |
| | | | 2400 × 3200[pixel] | 450 × 600[pixel] | ME |
| | | 5″ × 7″ | 600 × 800[pixel] | 150 × 200[pixel] | ME |
| | | | 1200 × 1600[pixel] | 300 × 400[pixel] | ME |
| | | | 2400 × 3200[pixel] | 450 × 600[pixel] | ME |
| | | LETTER | 600 × 800[pixel] | 300 × 400[pixel] | BL |
| | | | 1200 × 1600[pixel] | 450 × 600[pixel] | BL |
| | | | 2400 × 3200[pixel] | 450 × 600[pixel] | ME |
| | | A4 | 600 × 800[pixel] | 300 × 400[pixel] | BL |
| | | | 1200 × 1600[pixel] | 450 × 600[pixel] | BL |
| | | | 2400 × 3200[pixel] | 450 × 600[pixel] | ME |
| | PLAIN PAPER | 4″ × 6″ | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | BL |
| | | 5″ × 7″ | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | BL |
| | | LETTER | 600 × 800[pixel] | 150 × 200[pixel] | NN |
| | | | 1200 × 1600[pixel] | 300 × 400[pixel] | NN |
| | | | 2400 × 3200[pixel] | 300 × 400[pixel] | NN |
| | | A4 | 600 × 800[pixel] | 150 × 200[pixel] | NN |
| | | | 1200 × 1600[pixel] | 300 × 400[pixel] | NN |
| | | | 2400 × 3200[pixel] | 300 × 400[pixel] | NN |

FIG.7

TABLE FOR NORMAL MODE

| PRINT MODE | PAPER TYPE | PAPER SIZE | ORIGINAL IMAGE SIZE | REDUCED IMAGE SIZE | REDUCTION ALGORITHM |
|---|---|---|---|---|---|
| NORMAL MODE | GLOSSY PAPER | 4" × 6" | 600 × 800[pixel] | 150 × 200[pixel] | BL |
| | | | 1200 × 1600[pixel] | 150 × 200[pixel] | BL |
| | | | 2400 × 3200[pixel] | 300 × 400[pixel] | BL |
| | | 5" × 7" | 600 × 800[pixel] | 150 × 200[pixel] | BL |
| | | | 1200 × 1600[pixel] | 150 × 200[pixel] | BL |
| | | | 2400 × 3200[pixel] | 300 × 400[pixel] | BL |
| | | LETTER | 600 × 800[pixel] | 150 × 200[pixel] | BL |
| | | | 1200 × 1600[pixel] | 300 × 400[pixel] | BL |
| | | | 2400 × 3200[pixel] | 300 × 400[pixel] | BL |
| | | A4 | 600 × 800[pixel] | 150 × 200[pixel] | BL |
| | | | 1200 × 1600[pixel] | 300 × 400[pixel] | NN |
| | | | 2400 × 3200[pixel] | 300 × 400[pixel] | BL |
| | PLAIN PAPER | 4" × 6" | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | NN |
| | | 5" × 7" | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | NN |
| | | LETTER | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | NN |
| | | A4 | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | NN |

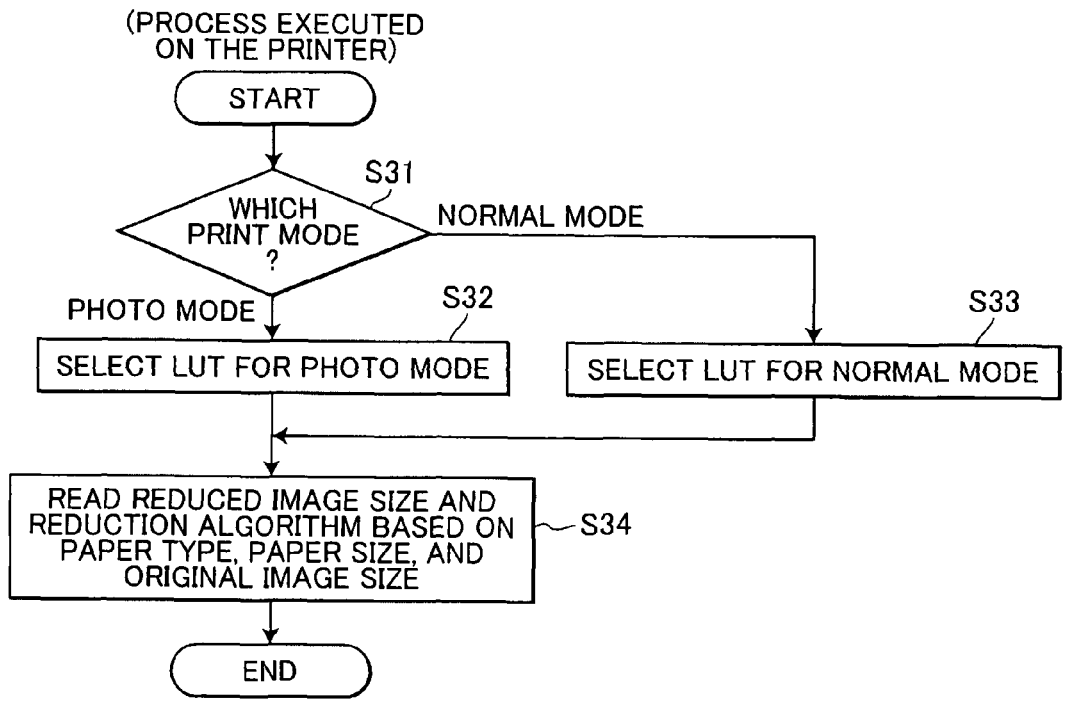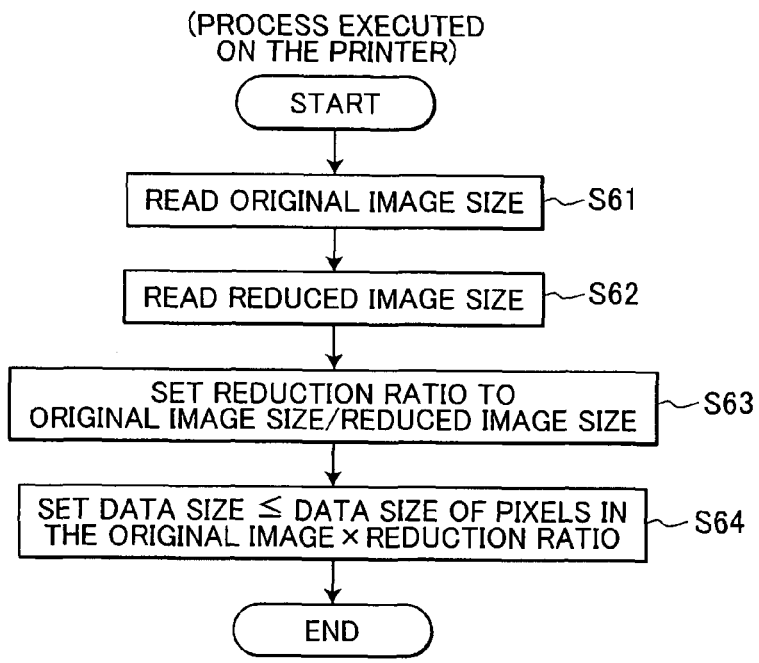

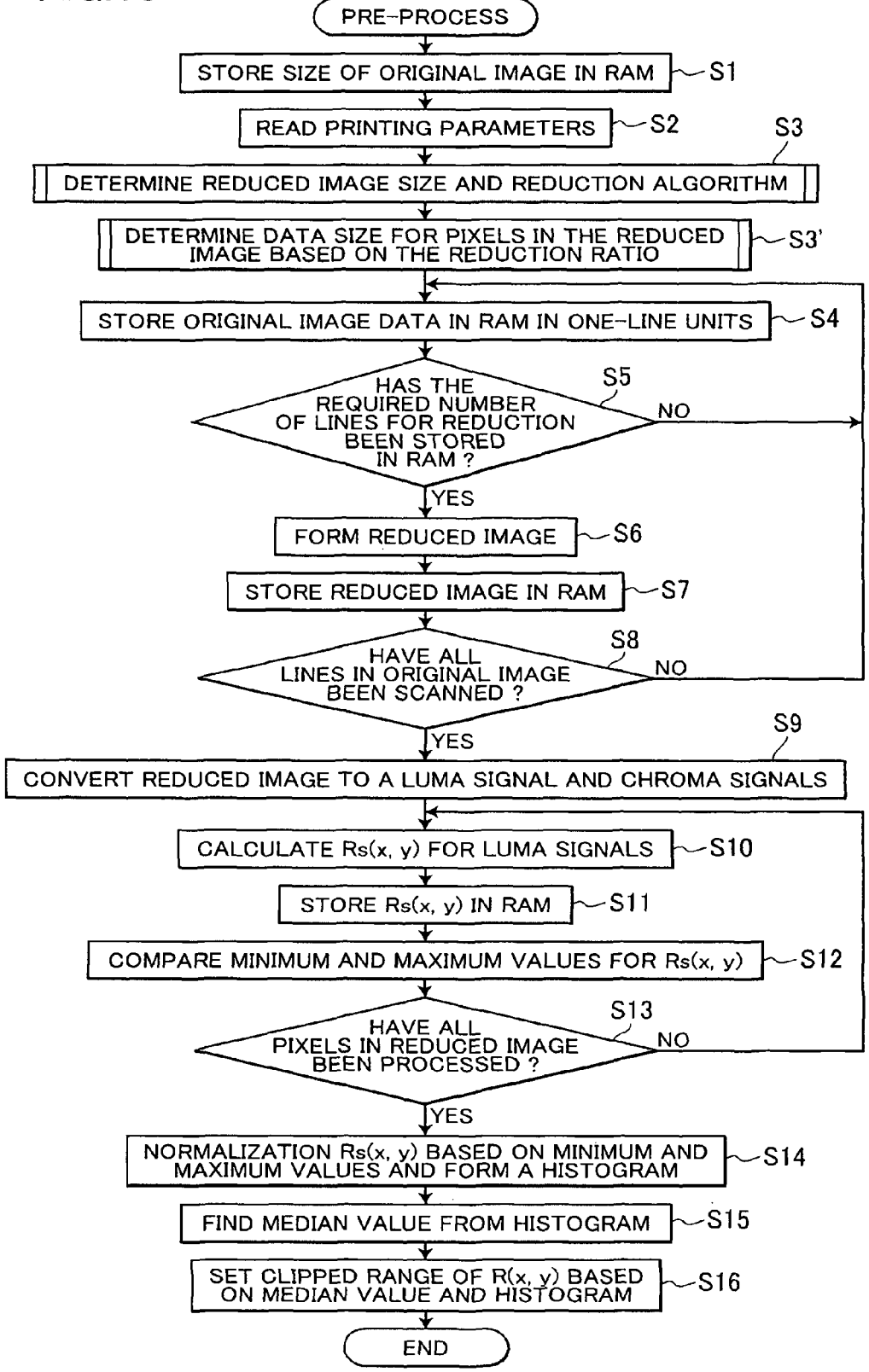

IMAGE PROCESSING DEVICE AND METHOD FOR REDUCING AN ORIGINAL IMAGE

CROSS REFERENCE TO RELATED APPLICATION

This application claims priorities from Japanese Patent Application No. 2006-235808 filed Aug. 31, 2006, Japanese Patent Application No. 2006-235496 filed Aug. 31, 2006, Japanese Patent Application No. 2006-235823 filed Aug. 31, 2006. The entire content of each of these priority applications is incorporated herein by reference.

TECHNICAL FIELD

The present invention relates to an image processor capable of performing Retinex processes at a high rate of speed using memory with a small storage capacity.

BACKGROUND

When taking a photograph of a subject under backlit conditions, e.g. against the sun, the image of the subject portion is an indistinct backlit image with low lightness and contrast, making it difficult to make out details of the subject. Image processing is performed to improve the quality of these backlit images, as well as images suffering in quality due to overexposure, underexposure, blurring due to jiggling when capturing the image, noise, insufficient light, and the like, in order to improve lightness and contrast in the image. One method used in conventional image processing is a Retinex process.

The Retinex process preserves the input image data for high-quality regions and improves the image quality primarily in low-quality regions. The Retinex process uses Gaussian filters for calibrating pixel data in the original image to values reflecting data of surrounding pixels, calculates reflectance component data for the original image from the natural logarithm of the calibrated pixel data, and calculates illuminance component data by dividing pixel data of the original image by reflectance component data of the original image. Specifically, this process divides the original image into reflectance components and illuminance components. Next, a process is performed to calibrate the brightness and level (contrast) of the luminance component through gamma correction or the like and subsequently generates improved image data for the original image in backlit portions and the like by combining the calibrated illuminance components with the reflectance components.

U.S. Pat. No. 6,885,482 (corresponding to Japanese Patent Application Publication No. 2001-69525) discloses a method of converting RGB values to a color space configured of a luminance component and color components, such as YCbCr or YIQ, performing the Retinex process only on the luminance component Y, while maintaining the color components, and converting the values back to RGB. Calibrating only the luminance component (i.e. not calibrating the color components) prevents an upset in the color balance and a shift in color. Further, since the Retinex process is performed only on the luminance component, this method requires fewer calculations than a method for performing the Retinex process on each RGB plane and, hence, can complete the process quicker.

U.S. Patent Application Publication No. 2004/0091164 (corresponding to Japanese Patent No. 3,731,577) discloses a method for improving the processing speed in the Retinex process. This method forms a reduced image (low-resolution image) from the original image using the average pixel method or the like, forms a peripheral (surround) average pixel value image (blurred image) by finding the peripheral (surround) average pixel value for each pixel in the reduced image, forms a Retinex processed image from the original image and an image produced by expanding the blurred image, and forms an output image from the original image and the Retinex processed image.

SUMMARY

It is an objective of the present invention to provide an image processor capable of performing Retinex processes at a high rate of speed using memory with a small storage capacity.

In order to attain the above and other objects, the present invention provides an image processor including a reduced image forming unit, a first reflectance value calculating unit, a normalizing parameter determining unit, a second reflectance value calculating unit, a normalizing unit, a correcting unit, and a reducing information determining unit. The reduced image forming unit reduces an original image having original pixels to form a reduced image having reduced pixels, A reduced image size indicated by the number of the reduced pixels is less than an original image size indicated by the number of the original pixels. The first reflectance value calculating unit calculates a first reflectance value for each reduced pixel based on a reduced pixel value of each reduced pixel and an average value of both each reduced pixel value and pixel values of peripheral pixels of each reduced pixel. The normalizing parameter determining unit determines a normalizing parameter based on a distribution of the first reflectance values. The second reflectance value calculating unit calculates a second reflectance value for each original pixel based on an original pixel value of each original pixel and an average value of both each original pixel value and pixel values of peripheral pixels of each original pixel. The normalizing unit normalizes the second reflectance values based on the normalizing parameter to obtain normalized Retinex values. The correcting unit corrects the original pixel values based on the normalized Retinex values. The reducing information determining unit determines first information based on second information with respect to at least one of quality of the corrected original image to be formed, a type of a recording medium on which the corrected original image is formed, a size of a recording medium on which the corrected original image is formed, the reduced image size, and the original image size. The reduced image forming unit reduces the original image based on the first information.

Another aspect of the present invention provides an image processing method including a reduced image forming step, a first reflectance value calculating step, a normalizing parameter determining step, a second reflectance value calculating step, a normalizing step, a correcting step, and a reducing information determining step. The reduced image forming step reduces an original image having original pixels to form a reduced image having reduced pixels. The reduced image size indicated by the number of the reduced pixels is less than an original image size indicated by the number of the original pixels. The first reflectance value calculating step calculates a first reflectance value for each reduced pixel based on a reduced pixel value of each reduced pixel and an average value of both each reduced pixel value and pixel values of peripheral pixels of each reduced pixel. The normalizing parameter determining step determines a normalizing parameter based on a distribution of the first reflectance values. The second reflectance value calculating step calculates a second reflectance value for each original pixel based on an original pixel value of each original pixel and an average value of both each original pixel value and pixel values of peripheral pixels of each original pixel. The normalizing step normalizes the second reflectance values based on the normalizing parameter to obtain normalized Retinex values. The correcting step corrects the original pixel values based on the normalized Retinex values. The reducing information determining step determines, before the reduced image forming step first information based on second information with respect to at least one of quality of the corrected original image to be formed, a type of a recording medium on which the corrected original image is formed, a size of a recording medium on which the corrected original image is formed, the reduced image size, and the original image size. The reduced image forming step reduces the original image based on the first information.

Another aspect of the present invention provides a storage medium storing a set of program instructions executable on an image processor. The set of program instructions includes a reduced image forming step, a first reflectance value calculating step, a normalizing parameter determining step, a second reflectance value calculating step, a normalizing step, a correcting step, and a reducing information determining step. The reduced image forming step reduces an original image having original pixels to form a reduced image having reduced pixels. The reduced image size indicated by the number of the reduced pixels is less than an original image size indicated by the number of the original pixels. The first reflectance value calculating step calculates a first reflectance value for each reduced pixel based on a reduced pixel value of each reduced pixel and an average value of both each reduced pixel value and pixel values of peripheral pixels of each reduced pixel. The normalizing parameter determining step determines a normalizing parameter based on a distribution of the first reflectance values. The second reflectance value calculating step calculates a second reflectance value for each original pixel based on an original pixel value of each original pixel and an average value of both each original pixel value and pixel values of peripheral pixels of each original pixel. The normalizing step normalizes the second reflectance values based on the normalizing parameter to obtain normalized Retinex values. The correcting step corrects the original pixel values based on the normalized Retinex values. The reducing information determining step determines, before the reduced image forming step, first information based on second information with respect to at least one of quality of the corrected original image to be formed, a type of a recording medium on which the corrected original image is formed, a size of a recording medium on which the corrected original image is formed, the reduced image size, and the original image size. The reduced image forming step reduces the original image based on the first information.

Another aspect of the present invention provides an image processor including a reduced image forming unit, a first reflectance value calculating unit, a normalizing parameter determining unit, a second reflectance value calculating unit, a normalizing unit, a correcting unit, and a data size determining unit. The reduced image forming unit reduces an original image having original pixels to form a reduced image having reduced pixels. The reduced image size indicated by the number of the reduced pixels is less than an original image size indicated by the number of the original pixels. Each reduced pixel has reduced pixel data. The reduced pixel data has a reduced data size and indicates the reduced pixel value. The first reflectance value calculating unit calculates a first reflectance value for each reduced pixel based on a reduced pixel value of each reduced pixel and an average value of both each reduced pixel value and pixel values of peripheral pixels of each reduced pixel. The normalizing parameter determining unit determines a normalizing parameter based on a distribution of the first reflectance values. The second reflectance value calculating unit calculates a second reflectance value for each original pixel based on an original pixel value of each original pixel and an average value of both each original pixel value and pixel values of peripheral pixels of each original pixel. The normalizing unit normalizes the second reflectance values based on the normalizing parameter to obtain normalized Retinex values. The correcting unit corrects the original pixel values based on the normalized Retinex values. The data size determining unit determines the reduced data size based on a reduction ratio of the reduced image size to the original image size. The reduced image forming unit reduces the original image based on the reducing algorithm.

BRIEF DESCRIPTION OF THE DRAWINGS

The particular features and advantages of the invention as well as other objects will become apparent from the following description taken in connection with the accompanying drawings, in which:

FIG. 3 is a flowchart illustrating steps in a pre-process performed according to the image-processing program;

FIG. 4 is a graph conceptually illustrating a clipped range for performing normalization;

FIG. 5 is a flowchart illustrating steps in a post-process executed after the pre-process;

FIG. 6 is a table for a photo mode referenced when the print mode is set to the photo mode;

FIG. 7 is a table for a normal mode referenced when the print mode is set to the normal mode;

FIG. 8 is a flowchart illustrating steps in a process for referencing the tables;

FIG. 10 is a flowchart illustrating steps in a pre-process executed based on an image-processing program according to a third embodiment;

FIGS. 11A-1C are explanatory diagrams showing examples of a positional relationship between pixels in an original image and a pixel in a reduced image; and FIG. 12 is a flowchart illustrating steps in a process for determining a data size.

DETAILED DESCRIPTION

Figure 1:
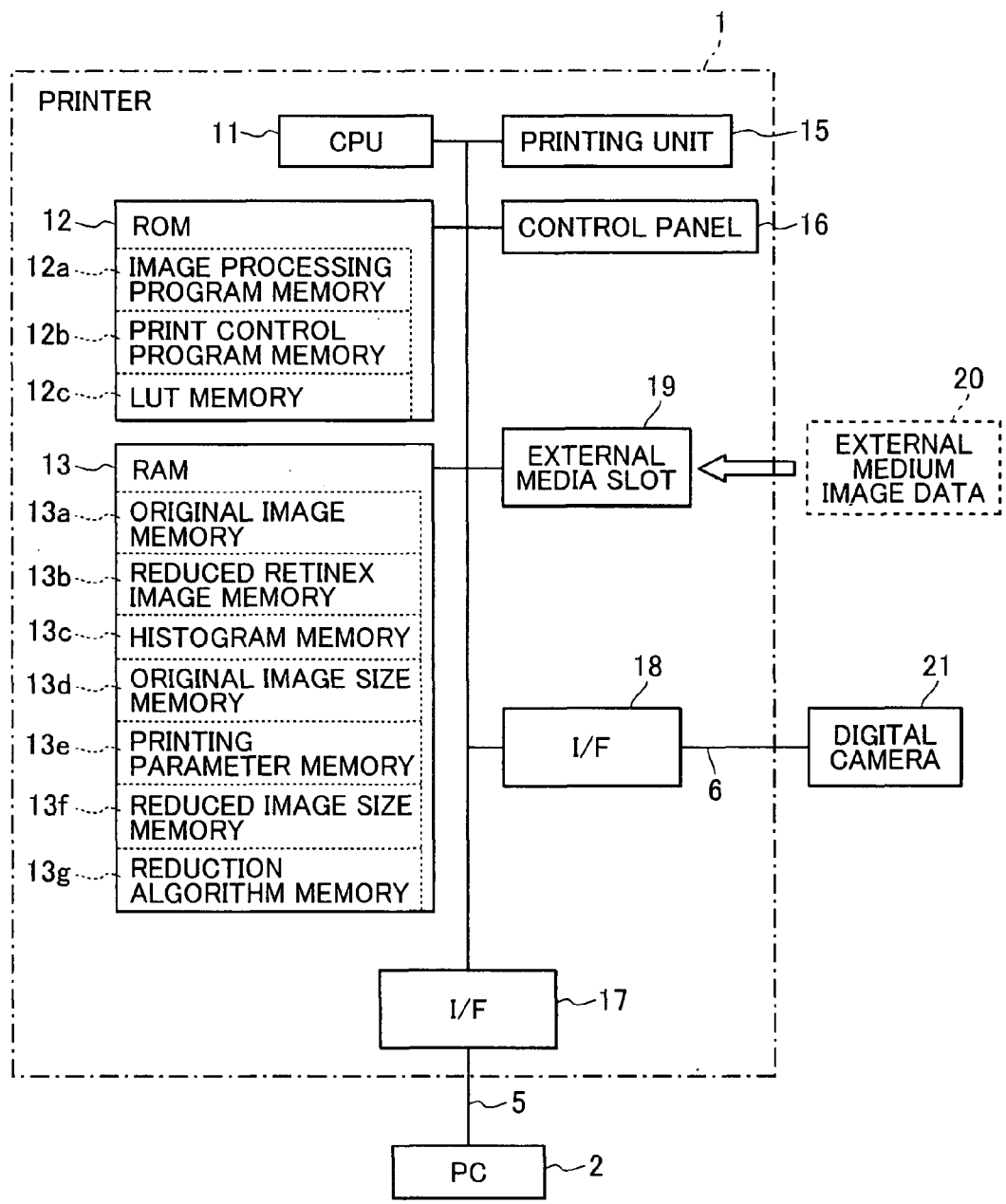
FIG. 1 is a block diagram showing the electrical structure of a printer provided with an image-processing program according to an embodiment.

An image processor according to a first embodiment of the present invention will be described with reference to drawings. FIG. 1 is a block diagram showing the electrical structure of a printer 1 having a function from performing an image process according to the embodiment. In the embodiment, the printer 1 is connected to a personal computer (hereinafter referred to as a "PC") 2, a digital camera 21, and/or an external medium 20. An image-processing program installed on the printer 1 executes a Retinex process on image data (image data for an original document or the like) inputted from the PC 2, digital camera 21, or external medium 20. The image-processing program corrects low-quality regions of the image data, such as backlit image regions.

As shown in FIG. 1, the printer 1 includes a CPU 11, a ROM 12, a RAM 13, a printing unit 15, and a control panel 16. The printing unit 15 has a print head and the like for printing out image data on a printing medium, such as paper. The control panel 16 has a user operating unit configured of a ten-key pad and the like, for example, enabling the user to input values for the size of the outputted image and the like.

The printer 1 also includes an interface 17, an interface 18, and an external media slot 19. The interface 17 is provided for connecting the printer 1 to the PC 2 with a cable 5. The interface 18 is provided for connecting the printer 1 to the digital camera 21 with a cable 6. The external media slot 19 allows the user to detachably mount the external medium 20 in the printer 1, the external medium 20 being a flash memory, such as an SD card or a Memory Stick, for example. The interfaces 17 and 18 use the Universal Serial Bus (USB) communication method.

Accordingly, image data stored on the PC 2 can be inputted into the printer 1 via the cable 5 and the interface 17, while image data captured by the digital camera 21 can be inputted into the printer 1 via the cable 6 and the interface 18. Further, image data stored on the external medium 20 can be inputted into the printer 1 when the external medium 20 is mounted in the external media slot 19.

Through operations on the PC 2, the user can set the printing mode of the printer 1 to a high-quality photo mode or a normal-quality normal mode, and can set the type of recording medium to glossy paper, inkjet paper, or plain paper. The user can also set the size of the recording medium to A4, B5, letter, and the like. The user-specified printing parameters are inputted into the printer 1 via the cable 5 and interface 17 and stored in a printing parameter memory 13e of the RAM 13.

The CPU 11 is an arithmetic processor that controls the overall operations of the printer 1. The ROM 12 stores various control programs executed by the CPU 11 and fixed values used when the CPU 11 executes the programs. The ROM 12 includes an image-processing program memory 12a storing an image-processing program for performing such image processing as the Retinex process, a print control program memory 12b storing a print control program for executing a printing operation, and an LUT memory 12c storing a look-up table referenced when executing the image-processing program. The image-processing program will be described later with reference to the flowcharts of FIGS. 3, 5, 8, and 10. The look-up table stored in the LUT memory 12c will be described later with reference to FIGS. 6 and 7.

The RAM 13 is a rewritable random-access memory that includes a work area for storing a set of registers required when the CPU 11 executes the control programs, and a temporary area for temporarily storing data during such processes. The RAM 13 also includes an original image memory 13a, a reduced Retinex image memory 13b, a histogram memory 13c, an original image size memory 13d, the printing parameter memory 13e, a reduced image size memory 13f, and a reduction algorithm memory 13g. The original image memory 13a stores original image data. The reduced Retinex image memory 13b stores reflectance values found in a Retinex process performed on reduced images. The histogram memory 13c stores the frequencies of reflectance values for finding parameters for normalization. The original image size memory 13d stores the size of the original image. The printing parameter memory 13e stores user-specified, printing parameters. The reduced image size memory 13f stores the size of a reduced image determined based on the printing parameters and the like. The reduction algorithm memory 13g stores a reduction algorithm determined based on the printing parameters and the like.

The original image memory 13a stores image data inputted from the PC 2, digital camera 21, and external medium 20 via the interface 17, interface 18, and external media slot 19, respectively. The original image data is stored in the original image memory 13a in one-line units. A reduced image is formed when data of the necessary number of lines is stored in the original image memory 13a. One line of original image data is stored in the original image memory 13a when the reduction algorithm is the nearest neighbor method, two lines when the reduction algorithm is the bi-linear method, three lines when the reduction algorithm is the bi-cubic algorithm, and a line number corresponding to the reduction ratio when the reduction algorithm is the average pixel method. In the embodiment, the original image data and output image data are configured of RGB values, each of which has a data size (or data length) of 8 bits indicating a value in the range 0-255.

The RGB values include components representing the three primary colors of light, i.e. an R value representing red, a G value representing green, and a B value representing blue. The combination of RGB values for each pixel of an input image indicates one color (hue, intensity, etc.). The greater the RGB values, the higher the luminance (brightness).

Data representing the size of an original image, such as the number of horizontal and vertical pixels, is attached to the original image data and stored in the original image size memory 13d.

The reduced Retinex image memory 13b is used for storing reflectance values Rs (x, y) found in the Retinex process for only the luminance signals of the reduced original image.

The histogram memory 13c is used for tabulating the frequency of the reflectance values Rs (x, y) to form a histogram. After the histogram is created, an upper limit and lower limit of a clipped range are set as parameters for normalization based on the histogram.

The original image size memory 13d stores the size of an original image extracted from the original image data when the original image data is read from the PC 2 or the like. The original image size stored in original image size memory 13d is referenced for determining the size of the reduced image and the reduction algorithm.

The printing parameter memory 13e stores parameters set by the user indicating whether the print mode is the high-quality photo mode or the normal quality normal mode; whether the type of recording medium is glossy paper, inkjet paper, or plain paper; and whether the size of the recording medium is A4, B5, letter, or the like. When the printing mode is selected, the printing resolution, droplet size, and the like established for the print mode are stored as parameters, and the printing process is executed based on these parameters.

The size of a reduced image and an algorithm for reducing the original image are set based on these printing parameters and the size of the original image and are stored in the reduced image size memory 13f and reduction algorithm memory 13g, respectively. Generally, a large reduced image size is set when emphasizing image quality over processing speed, while a small reduced image size is set when emphasizing processing speed over image quality.

The algorithm used for reducing the original image may be one of the nearest neighbor method for sampling the value of a pixel nearest a position in the original image corresponding to a pixel of the reduced image and for using the sampled pixel value as it is, and the bi-linear method, average pixel method, or the like for performing interpolation using pixels surrounding a position in the original image corresponding to a pixel in the reduced image. The nearest neighbor method is used when processing speed is given priority over image quality, and the bi-linear method or average pixel method is used when giving priority to image quality over processing speed.

These printing parameters can be set by the user on the PC 2 and inputted into the printer 1 or may be set through operating buttons provided on the control panel 16.

The control panel 16 is provided with LCDs for indicating printing parameters and the like, and various buttons for setting printing parameters or parameters related to image processing and for indicating a desire to execute an image process or a printing process.

Figure 2:
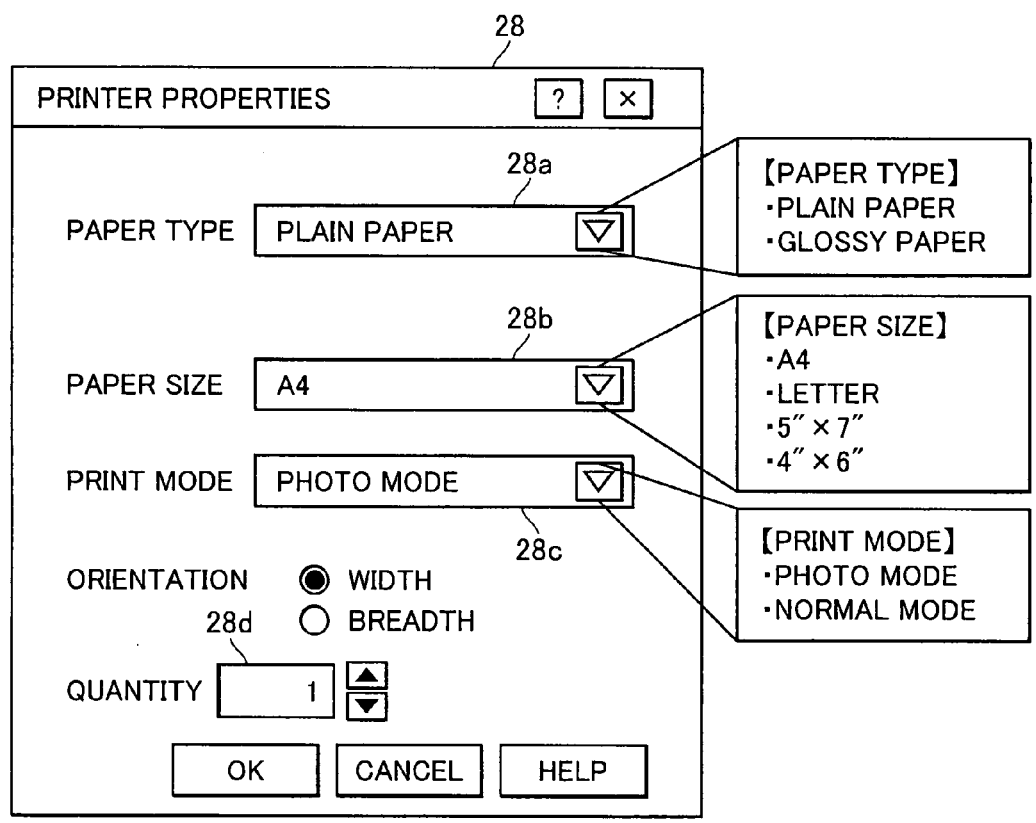
FIG. 2 is an explanatory diagram showing a window for setting printing parameters.

Next, various printing parameters set on the PC 2 connected to the printer 1 will be described with reference to FIG. 2. FIG. 2 shows a printing parameter setting window 28 displayed on a display unit of the PC 2 when the user selects an option to set the printing parameters.

The printing parameter setting window 28 includes a paper type selection box 28a for selecting a type of printing paper for the printing process, a paper size setting box 28b for setting the size of the paper, a print node setting box 28c for setting the print mode, and a quantity setting box 28d for setting the quantity to be printed.

The paper type selection box 28a has a display area for displaying the selected paper type, and a downward-pointing triangular-shaped icon positioned in the right end of this display area. The user can display the pull-down menu shown in FIG. 2 by operating the mouse to align a cursor with the icon and performing a mouse click. By further aligning the cursor with an item in the subsequently displayed pull-down menu and clicking a button on the mouse, the user can select the item indicated by the cursor.

In the embodiment, the user can select plain paper or glossy paper as the paper type. Plain paper is currently selected in the example of FIG. 2.

Similarly, the paper size setting box 28b has an area displaying the selected paper size, and an icon indicating a pull-down menu for selecting a paper size. The user can select one of A4, letter, 5"×7", and 4"×6" as the paper size.

The print mode setting box 28c also has an area displaying the selected print mode, and an icon indicating a pull-down menu for selecting a print mode. The user can select either the photo mode or the normal mode as the print mode. The photo mode is used for printing in a higher quality than in the normal mode at a higher resolution. For example, the resolution in the photo mode is 1200×1200 dpi, while the lower resolution in the normal mode is 600×600 dpi. When the printer 1 is of an inkjet type, the printer 1 may be configured to use different droplet sizes and different types of ink based on the resolution.

The quantity setting box 28d is configured of an area for displaying the quantity to be printed. To the right of this area are provided an upward-pointing triangular-shaped incrementing icon for increasing the quantity, and a downward-pointing triangular-shaped decrementing icon for decreasing the quantity. The user can set the printing quantity by aligning the cursor with these icons and clicking the mouse.

In addition to the icons described above, the printing parameter setting window 28 also includes radio buttons for setting the orientation of the image printed on the paper, an OK button for making the settings effective while closing the settings window, a Cancel button for closing the settings window without making the settings effective, and a Help button for displaying a window with an explanation of the settings.

Printing parameters set on the PC 2 in this way are inputted into the printer 1 via the cable 5 and the interface 17 and stored in the printing parameter memory 13e.

Next, an image process executed on the CPU 11 will be described with reference to FIGS. 3 through 5. FIGS. 3 and 5 are flowcharts illustrating steps in the image process. The process shown in FIG. 3 is referred to as a pre-process in which the original image is reduced and a clipped range is set for normalizing the reflectance values R based on the reduced image.

In S1 of the pre-process, the CPU 11 stores data indicating the original image size attached to the original image data in the original image size memory 13d. The data indicating the image size is expressed by the number of vertical and horizontal pixels constituting the original image, which is normally rectangular.

In S2 the CPU 11 reads parameters needed for setting the reduced image size and the reduction algorithm from the printing parameters stored in the printing parameter memory 13e. In the embodiment, printing parameters required for these settings are the print mode, paper type, and paper size.

In S3 the CPU 11 determines the reduced image size and the reduction algorithm based on these parameters and stores the determined reduced image size in the reduced image size memory 13f and the reduction algorithm in the reduction algorithm memory 13g. A reduced image will be formed based on the reduced image size and reduction algorithm determined in S3. The process of S3 will be described later in greater detail with reference to FIGS. 6 through 8.

The digital camera 21 or the PC 2 compresses image data according to the JPEG or other compression technique and sequentially stores horizontal lines of pixels in the rectangular image. In the process for forming the reduced image, in S4 the CPU 11 reads one line worth of the stored original image from the PC 2 or the like and stores this line unit in the original image memory 13a of the RAM 13.

In S5 the CPU 11 determines whether the number of lines of image data stored in the original image memory 13a is sufficient for performing reduction with the reduction algorithm stored in the reduction algorithm memory 13g. The required number of lines for performing reduction is one line if the reduction algorithm stored in the reduction algorithm memory 13g is the nearest neighbor method, two lines for the bi-linear method, three lines for the bi-cubic technique, and the number of lines corresponding to the reduction ratio for the average pixel method.

If the number of lines stored in the original image memory 13a is insufficient for reduction (S5: NO), the CPU 11 returns to S4. When the number of lines is sufficient for reduction (S5: YES), then in S6 the CPU 11 forms a reduced image based on the reduction algorithm and in S7 stores this reduced image in a temporary area (not shown) of the RAM 13. After forming the reduced image, the CPU 11 overwrites data currently stored in the original image memory 11a with subsequent lines of data read for the original image, thereby reducing the required storage capacity of the original image memory 13a.

In S8 the CPU 11 determines whether all lines in the original image have been scanned to form the reduced image. If unprocessed lines remain (S8: NO), the CPU 11 returns to S4. However, if all lines have been processed (S8: YES), then in S9 the CPU 11 converts each pixel in the reduced image to a luminance component Y and color components Cb and Cr.

The luminance component Y and the color components Cb and Cr are calculated from the RGB values of the reduced image based on the following equation 1.

$$\begin{pmatrix} Y \\ Cb \\ Cr \end{pmatrix} = \begin{pmatrix} 0.30 & 0.59 & 0.11 \\ -0.17 & -0.34 & 0.51 \\ 0.51 & -0.43 & -0.08 \end{pmatrix} \begin{pmatrix} R \\ G \\ B \end{pmatrix} \qquad \text{Equation 1}$$

The luminance signal Y and color signals Cb and Cr calculated above may be temporarily stored in the RAM 13 or the like to be used in subsequent processes. However, if it is desirable to reduce the storage volume, these values may be calculated in the above equation 1 by reading pixel values from the original image as needed without storing the values in memory.

In S10, the CPU 11 calculates a reflectance Rs (x, y) from the luminance signal Y calculated above for one pixel at a location (x, y) in the reduced image, wherein x is the horizontal coordinate and y is the vertical coordinate. Here, the "s" is added to the end of symbols for indicating the reduced image as opposed to the original image. The reflectance Rs is calculated according to the following equation 2.

$$Rs(x, y) = \log \frac{Ys(x, y)}{Fs(x, y) * Ys(x, y)} \qquad \text{Equation 2}$$

Here, Ys(x, y) is the intensity of the luminance signal at the coordinate (x, y), Fs (x, y) is a filter coefficient of the coordinate (x, y), and "*" is the convolution operator. Further, log is the natural logarithm to the base e.

In S11, the CPU 11 stores the reflectance Rs (x, y) found in the above calculations in the reflectance memory 13b of the RAM 13. In S12 the CPU 11 compares the reflectance Rs (x, y) obtained in S11 to maximum and minimum values of reflectance Rs (x, y) values obtained thus far.

Specifically, the maximum and minimum values are both set to the reflectance Rs (x, y) found for the first coordinates. All reflectance Rs (x, y) values subsequently obtained are compared with the current maximum and minimum values. If the current reflectance Rs (x, y) is greater than the maximum value, then this reflectance Rs (x, y) is set as the new maximum value. Similarly, if the current reflectance Rs (x, y) is less than the minimum value, then this reflectance Rs (x, y) is set as the new minimum value. When the current reflectance Rs (x, y) is less than the maximum value and greater than the minimum value, the maximum and minimum values remain unchanged.

In S13, the CPU 11 determines whether the process in S10-S12 has been completed for all coordinates in the reduced image. If unprocessed coordinates remain (S13: NO), the CPU 11 returns to S10. However, if the process has been completed for all coordinates (S13: YES), then in S14 the CPU 11 normalizes the reflectance Rs (x, y) values based on the maximum and minimum values obtained in S12 to form a histogram in the histogram memory 13c.

In S15 the CPU 11 finds a median value M from the histogram formed in S14 and in S16 sets a clipped range of reflectance Rs (x, y) values (normalization parameters) based on the median value M and the histogram.

FIG. 4 is a histogram in which the reflectance Rs (x, y) found in the equation 2 for all coordinates is normalized to be mapped on a scale of 256 levels with a minimum value of 0 and a maximum value of 255. Specifically, the normalization is achieved through a process of setting the minimum reflectance Rs (x, y) among all coordinates to 0 and the maximum value to 255 and linearly setting all reflectance Rs (x, y) values for other coordinates to integers between 0 and 255. The histogram is formed in the histogram memory 13c by tabulating the frequency of pixels indicating each computed value between the maximum and minimum values.

From this histogram, a median value M is found. An upper value U and a lower value D are set based on the median value M so that a 45% portion of all the pixels have values falling in a range from the median value M to the upper value U and so that another 45% portion of all the pixels have values falling in a range from the lower value D to the median value M. This ensures that a 5% portion of all the pixels have values greater than the upper value U, and another 5% portion of all the pixels have values smaller than the lower value D. A reflectance Rs(x, y) corresponding to the upper value U is set as an upper limit reflectance value UpR, and a reflectance Rs(x, y) corresponding to the lower value D is set as a lower limit reflectance value DownR. The upper limit reflectance value UpR and lower limit reflectance value DownR determine the upper and lower limits of a clipped range, respectively, and are set as the normalization parameters.

Next, a post-process performed based on the clipped range found in the pre-process of FIG. 3 will be described with reference to FIG. 5. The post-process is a Retinex process performed on the original image. FIG. 5 is a flowchart illustrating steps in this Retinex process. The post-process is performed on each pixel in the original image and sequentially outputs processed pixel values (RGB values) to the printing unit 15.

In S21 at the beginning of the process, the CPU 11 finds the luminance signal Y for a pixel at a location (x, y) in the original image based on the equation 1. At this time, color signals Cb and Cr are also obtained for the subject pixel. The CPU 11 further calculates the reflectance R (x, y) for the subject pixel based on the luminance signal Y and based on the following equation 3.

$$R(x, y) = \log \frac{Y(x, y)}{F(x, y) * Y(x, y)} \qquad \text{Equation 3}$$

Here, Y(x, y) is the intensity of the luminance signal at the coordinate (x, y), F(x, y) is a filter coefficient of the coordinate (x, y) for the original image, and "*" is the convolution operator. Further, log is the natural logarithm to the base e.

In S22 the CPU 11 normalizes the reflectance R (x, y) based on the clipped range, which has been found in S16 of FIG. 3 using the reduced image, to obtain a normalized reflectance refle(x, y).

Specifically, the normalized reflectance (normalized Retinex value) refle(x, y) is set to 0.0 when the value of reflectance R (x, y) is less than or equal to the DownR, is set to 1.0 when the value of reflectance R (x, y) is greater than or equal to UpR, and is calculated based on the following equation 4 when the value of reflectance R (x, y) is greater than DownR and less than UpR.

$$refle(x, y) = \frac{R(x, y) - DownR}{UpR - DownR} \qquad \text{Equation 4}$$

It is noted that the calculation result "refle(x, y)" of Equation 4 is further added with 0.3' and the added result is substituted for the value "refle(x, y)". This ensures that the value "refle (x, y)" falls in a range of 0.3 to 1.3.

The following table shows the difference between a clipped range (upper limit UpR and lower limit DownR) found based on the reduced image, and a clipped range found based on the original image by experiments. In the experiments, the clipped range (upper limit UpR and lower limit DownR) was determined based on the reduced image by executing the processes of S12-S18 on the reflectance values Rs(x, y) in the reduced image. The clipped range (upper limit UpR and lower limit DownR) was determined also based on the original image by executing processes the same as the processes of S12-S18 on the reflectance values R(x, y) in the original image in place of the reflectance values Rs(x, y) of the reduced image.

TABLE 1

|  | Clipped range | | Maximum/Minimum values | |
| --- | --- | --- | --- | --- |
|  | Upper limit | Lower limit | Maximum value | Minimum value |
| Original image | 0.825 | −0.822 | 2.712 | −4.063 |
| Reduced image | 0.742 | −0.755 | 1.729 | −2.607 |
| Difference | 0.083 | 0.067 | 0.983 | 1.456 |

As shown in this table, the maximum value of reflectance values R(x, y) for the original image is 2.712, and the minimum value −4.063, while the maximum value of reflectance values Rs(x, y) for the reduced image is 1.729, and the minimum value −2.607. Hence, the difference between the maximum reflectance for the original image and the maximum reflectance for the reduced image is 0.983, and the difference between the minimum reflectance for the original image and the minimum reflectance for the reduced image is 1.456. These differences are considerably large.

However, the upper limit of the clipped range found based on the reflectance values of the original image is 0.825 and the lower limit −0.822, while the upper limit found based on the reflectance values of the reduced image is 0.742 and the lower limit −0.755. Hence, the difference between the upper limit of the clipped range for the reflectance values for the original image and the upper limit of the clipped range for the reflectance values for the reduced image is 0.083, while the difference between the lower limit of the clipped range for the reflectance values for the original image and the lower limit of the clipped range for the reflectance values for the reduced image is 0.067. These differences are small.

Since there is no great difference between the clipped range found based on the reduced image and the clipped range found based on the original image, the clipped range found based on the reduced image can be applied to the original image.

In S23 the CPU 11 performs the Retinex process on luminance using refle(x, y) in the following equation 5 to obtain a Retinex-corrected luminance value Yout(x, y) (luminance signal Y). Here, y is an arbitrary constant normally set to 1.5.

$$Yout(x, y) = \frac{Y(x, y)}{\left(\frac{Y(x, y)}{255 \times refle(x, y)}\right)^{(1-1/y)}} \quad \text{Equation 5}$$

In S24 the CPU 11 converts the Retinex-corrected luminance value Yout (x, y) and the color signals Cb and Cr obtained in S21 to RGB values, using the following equation 6.

$$\begin{pmatrix} R \\ G \\ B \end{pmatrix} = \begin{pmatrix} 1.0 & 0 & 1.37 \\ 1.0 & -0.34 & -0.70 \\ 1.0 & 1.73 & 0 \end{pmatrix} \begin{pmatrix} Yout \\ Cb \\ Cr \end{pmatrix} \quad \text{Equation 6}$$

In the process described above, the CPU 11 executes the Retinex process on a luminance signal for the original image and finds pixel values by converting the Retinex-processed luminance signal and the color signals back to RGB values. In S25 the CPU 11 outputs the processed pixel values to the printing unit 15. Hence, by identifying the clipped range for performing normalization in the pre-processor the CPU 11 can sequentially process each pixel and output the results to the printing unit 15 in the post-process, thereby reducing the time from the start of image processing to the start of the printing operation.

In S26 the CPU 11 determines whether the above process has been completed for all pixels in the original image. If some unprocessed pixels remain (S26: NO), then the CPU 11 returns to S21. However, if the process has been completed for all pixels (S26: YES), then the CPU 11 ends the post-process.

In this way, the printer 1 of the embodiment uses the clipped range found in the pre-process based on reflectance values of the reduced image to find a clipped range for normalizing reflectance values in the original image. Through this process, the printer 1 can find the clipped range in fewer operations than the number of operations required to find the clipped range for the original image, thereby improving processing speed. Further, since the reduced image having fewer pixels than the original image is stored in the temporary area of the RAM 13, the storage capacity need not be as large as when storing the original image.

More specifically, now assume that a clipped range were determined based on the original image. In such a case, the reflectance R (x, y) values must be stored for all the pixels of the original image. An enormous amount of storage capacity will be necessary for storing the reflectance R (x, y) values found through logarithmic computations. Further, since the number of logarithmic computations on the reflectance R (x, y) increases according to the volume of reflectance R (x, y) data, the length of time required before the computer can begin outputting the processed image will increase according to the size of the original image.

Next, the process in S3 of FIG. 3 for determining the reduced image size and reduction algorithm will be described with reference to FIGS. 6 through 8.

As described above, it is possible to determine a clipped range quickly and to perform image processing with a small storage capacity by reducing the original image, determining a clipped range based on the reduced image, and performing a correction process on pixels in the original image based on this clipped range. However, in some cases, it is not possible to set an appropriate clipped range, such as when the reduced image is smaller than necessary, and when the quality of the reduced image is too much degraded. On the other hand, if the reduced image is set to a larger size than necessary or if the quality of the reduced image is set higher than necessary, processing will require a greater length of time, reducing processing speed. Therefore, a reduced image size and reduction algorithm must be selected to suit the user-specified printing parameters and the like.

FIGS. 6 and 7 are look-up tables used to set the reduced image size and reduction algorithm based on the printing mode, paper type, paper size, and original image size. FIG. 6 is a look-up table used for the photo mode, while FIG. 7 is a look-up table used for the normal mode. These tables are stored in the LUT memory 12c of the ROM 12 and are referenced in the process described in the flowchart of FIG. 8.

The table in FIG. 6 is selected when the print mode has been set to the photo mode. Choices for the reduced image size and the reduction algorithm are first categorized by paper type. In the embodiment, the categories of paper type include glossy paper and plain paper, but may also include other categories, such as inkjet paper.

After paper type, the selections are categorized by paper size, in order from smallest to largest. In this example, the categories of paper size are 4"×6", 5"×7", letter, and A4. Each paper size is further categorized by original image size. In this example, possible original image sizes for the input image are 600×800, 1200×1600, and 2400×3200 (pixels). The reduced image size and reduction algorithm are set based on these sizes.

In the embodiment, the reduced image size can be set to one of three selections, 150×200, 300×400, and 450×600, while the reduction algorithm can be set to one of three types, the average pixel method (ME), the bi-linear method (BL), and the nearest neighbor method (NN). The table in FIG. 7 is used when the printing mode has been set to the normal mode. As in the photo mode, selections are categorized by paper type, paper size, and original image size, and the reduced image size and reduction algorithm are set based on these values.

FIG. 8 is a flowchart illustrating steps in the process of S3 shown in FIG. 4. In S31 of this process, the CPU 11 determines whether the print mode selected as a printing parameter has been set to the photo mode or the normal mode. The CPU 11 selects the table for the photo mode in S32 it the print mode has been set to the photo mode, and selects the table for the normal mode in S33 when the print mode has been set to the normal mode. In S34 the CPU 11 reads the reduced image size and reduction algorithm set corresponding to the paper type and paper size set as printing parameters and the original image size stored in the original image size memory 13d, and stores the reduced image size and reduction algorithm in the reduced image size memory 13f and the reduction algorithm memory 13g, respectively.

In the first embodiment described above, the printer 1 forms a reduced image by compressing the original image, determines a clipped range for normalizing reflectance values based on the reduced image, obtains a reflectance value for each pixel in the original image, and performs the Retinex process for normalizing reflectance values in the original image based on the clipped range determined for the reduced image. When forming the reduced image, the size of the reduced image is set based on the size of the original image and the printing parameters. Accordingly, the printer 1 can set the reduced image size for giving priority to speed over image quality or for giving priority to image quality over speed, for example, based on the user's preference.

Next, a second embodiment of the present invention will be described with reference to FIG. 9. While the reduced image size and reduction algorithm were determined by referencing a look-up table in the first embodiment described above, the second embodiment gives an example in which the program is configured to select the reduced image size and the reduction algorithm under all conditions, without referencing a table.

Figure 9:
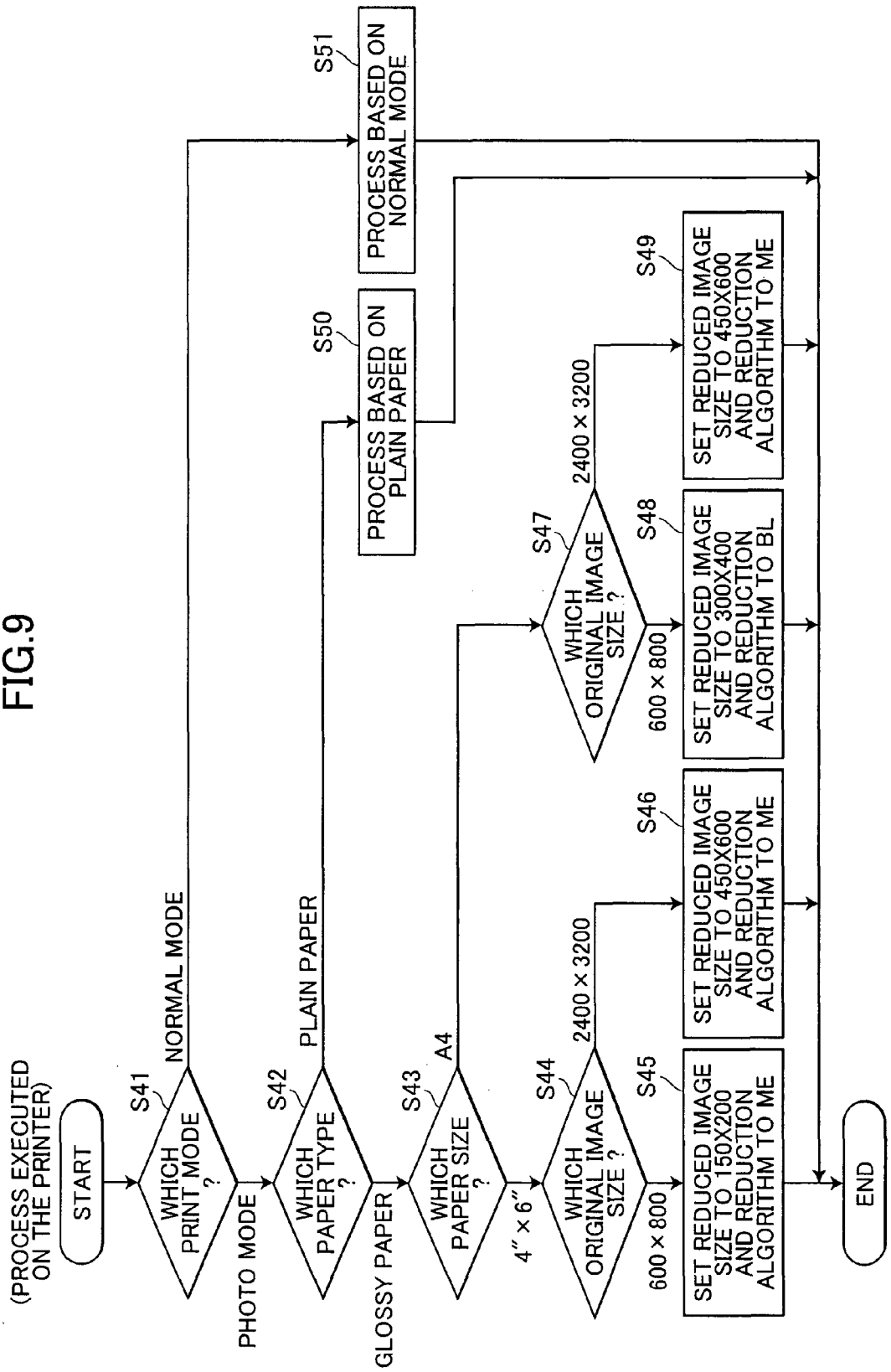
FIG. 9 is a flowchart illustrating steps in a process according to a second embodiment for setting the reduced image size without referencing a table.

FIG. 9 is a flowchart illustrating steps in the process according to the second embodiment performed in place of the process according to the first embodiment in FIG. 8. All other processes are identical to those in the first embodiment and, hence, a description of these processes will not be repeated.

In S41 of FIG. 9, the CPU 11 determines whether the print mode has been set to the photo mode or the normal mode. If the print mode is set to the photo mode, then in S42 the CPU 11 determines whether the paper type has been set to glossy paper or plain paper.

If the paper type has been set to glossy paper, then in S43 the CPU 11 determines whether the paper size is 4"×6" or A4. In this flowchart, only two types of paper sizes have been included for simplification.

If the paper size is set to 4"×6", then in S44 the CPU 11 determines whether the original image size is 600×800 or 2400×3200. If the original image size is 600×800, then in S45 the CPU 11 sets the reduced image size to 150×200 and sets the reduction algorithm to the average pixel method.

If the original image size is 2400×3200, then in S46 the CPU 11 sets the reduced image size to 450×600 and sets the reduction algorithm to the average pixel method.

However, if the CPU 11 determines in S43 that the paper size has been set to A4, then in S47 the CPU 11 determines whether the original image size is 600×800 or 2400×3200. If the original image size is 600×800, then in S48 the CPU 11 sets the reduced image size to 300×400 and sets the reduction algorithm to the bi-linear method.

If the original image size is 2400×3200, the CPU 11 sets the reduced image size to 450×600 and sets the reduction algorithm to the average pixel method. Similarly, if the CPU 11 determines in S42 that the paper type has been set to plain paper, then in S50 the CPU 11 performs a process similar to S43-S49 to set the reduced image size and reduction algorithm based on the paper size and original image size.

Similarly, if the CPU 11 determines is S41 that the print mode has been set to the normal mode, then in S51 the CPU 11 performs a process similar to S42-S49 to set the reduced image size and reduction algorithm based on the paper type, paper size, and original image size. The details of processes in S50 and S51 have been omitted to avoid complicating the description.

With the process according to the second embodiment described above, the printer 1 can set a suitable reduced image size and reduction algorithm, without referencing a look-up table, by including reduced image sizes and reduction algorithms corresponding to the above conditions in the program.

Next, a third embodiment of the present invention will be described with reference to FIGS. 10 through 12.

As shown in FIG. 10, the pre-process according to the third embodiment has an additional step S3' performed between S3 and S4 in the pre-process according to the first embodiment. In S3' the CPU 11 finds a reduction ratio based on the reduced image size set in S3 and the original image size stored in the original image size memory 13d to determine the data size for the reduced image.

Here, operations are performed according to the bi-linear method or the average pixel method to weight values for a plurality of pixels surrounding a position corresponding to the original image in order to calculate pixel values in the original image. However, when the original pixel values are expressed in integers, the calculated values have decimals. Rounding off the values to the right of the decimal point leaving integer values produces error that may reduce the quality of the corrected image. Hence, in the embodiment the data size (bit rate) is increased to retain the value to the right of the decimal. The pixel value in the embodiment signifies the shade of the pixel.

Rounding error produced when using the bi-linear method or average pixel method to calculate pixel values in a reduced image when forming the reduced image by compressing the original image will be described with reference to FIGS. 11A-11C.

Figure 11C:
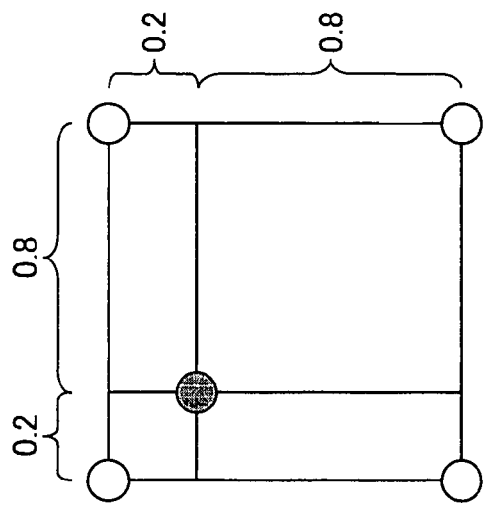
Figure 11B:
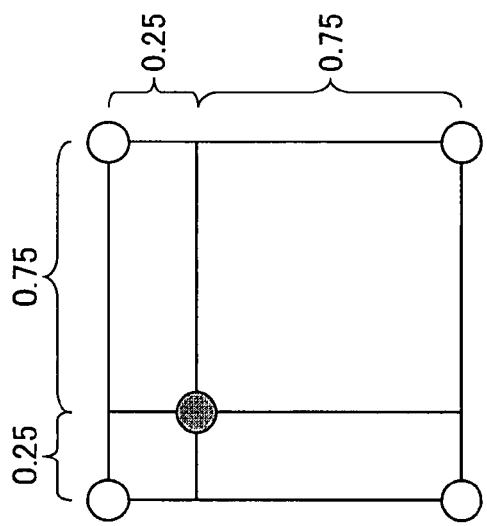
Figure 11A:
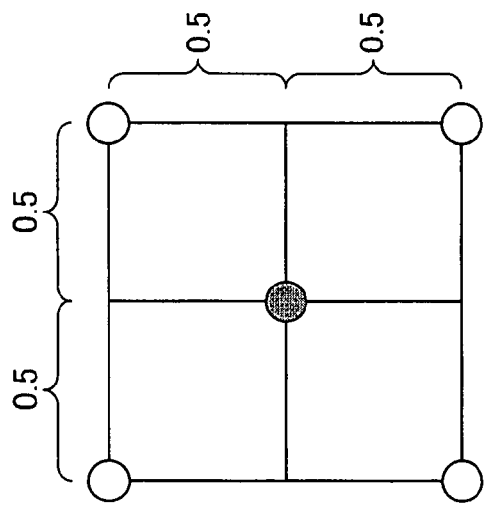

FIGS. 11A-11C illustrate the relationship between the position of a pixel in the reduced image and the positions of pixels in the original image when finding pixel values for the reduced image. In these drawings, white circles depict the positions of pixels in the original image, and black circles depict the position of a pixel in the reduced image. The positional relationship of a pixel in the reduced image to pixels in the original image with respect to the vertical and horizontal directions are shown, with the horizontal and vertical intervals between pixels in the original image set to the value 1.0.

FIG. 11A shows a case in which the position of the pixel in the reduced image is centered between horizontal and vertical pixels in the original image, i.e., separated 0.5 from the pixels in the original image in both the horizontal and vertical directions.

FIG. 11B shows a case in which the position of the pixel in the reduced image relative to the horizontal direction is a distance of 0.25 from the left pixels in the original image and a distance of 0.75 from the right pixels, while the position of the pixel in the reduced image relative to the vertical direction is a distance of 0.25 from the top pixels and a distance of 0.75 from the bottom pixels.

Similarly, FIG. 11C shows a case in which the position of the pixel in the reduced image relative to the horizontal direction is a distance of 0.2 from the left pixels in the original image and a distance of 0.8 from the right pixels, while the position of the pixel in the reduced image relative to the vertical direction is a distance of 0.2 from the top pixels and a distance of 0.8 from the bottom pixels.

If the pixel value is 124 for the upper left pixel in the original image, 233 for the upper right pixel, 65 for the lower left pixel, and 97 for the lower right pixel, the following table shows the precision for cases in which the data size (bit rate) of the calculated value is 8 bits, 16 bits, and 32 bits when calculating pixel values in the reduced image according to the average pixel method.

in 8 bits is 129. Accordingly, a difference of 0.75 is produced. The calculated value expressed in 16 bits is 129.75, which is also an error of 0. Similarly, the value expressed in 32 bits is also 129.75, which is an error of 0.

In the case of FIG. 11C shown in (c) of Table 2, the calculated value is 130.92, and is 130 when expressed in 8 bits after rounding off the value to the right of the decimal. In this case, an error of 0.92 is produced. The value is 130.9179688 when expressed in 16 bits, producing an error of 0.0020312. The same value is 130.92 when expressed in 32 bits, resulting an extremely small error. (Values in Table 2 are expressed in a floating point format used in programming languages.)

From this table, it is clear that the calculated values expressed in 16 bits have less error than those expressed in 8 bits, and the calculated values expressed in 32 bits have even less error. Hence, the greater the data size of the calculated value, the less error.

Next, the process in S3' of FIG. 10 for determining the data size of calculated values for the reduced image will be described with reference to FIG. 12. Although larger data sizes for the calculated values of the reduced image can maintain the original precision of the calculated values better, larger values also require a large memory capacity for storing the calculated values and more time for performing calculations. On the other hand, if the reduction ratio of the reduced image relative to the original image is small, the number of pixels in the reduced image is not decreased by much. Accordingly, the image quality can be maintained without increasing the data size. However, when the reduction ratio is large, there is a greater decrease in the number of pixels. Accordingly, it is necessary to increase the data size to maintain image quality. Therefore, in the embodiment the data size (bit rate) of calculated values for the reduced image is set larger when the reduction ratio of the reduced image relative to the original image is larger.

FIG. 12 is a flowchart illustrating steps in the process for setting the data size of calculated values for the reduced image. In S61 of FIG. 12, the CPU 11 reads the original image size stored in the original image size memory 13d in order to find the reduction ratio. In S62 the CPU 11 reads the reduced image size stored in the reduced image size memory 13f and in S63 finds the reduction ratio by dividing the original image size by the reduced image size. This reduction ratio is based on the vertical or horizontal size of the images and not area.

In S64 the CPU 11 multiplies the data size (8 bits) of the pixel values in the original image by the reduction ratio and

TABLE 2

|     | | 8 bits | | 16 bits | | 32 bits | |
| --- | --- | --- | --- | --- | --- | --- | --- |
|     | Calculated value | Stored in 8 bits | Difference from calculated value | Stored in 16 bits | Difference from calculated value | Stored in 32 bits | Difference from calculated value |
| (a) | 131.6875 | 131 | 0.6875 | 131.6875 | 0 | 131.6875 | 0 |
| (b) | 129.75 | 129 | 0.75 | 129.75 | 0 | 129.75 | 0 |
| (c) | 130.92 | 130 | 0.92 | 130.9179688 | 0.0020312 | 130.92 | 4.29153E−08 |

As shown in (a) of Table 2 for the case of FIG. 11A, the calculated value is 131.6875, while the value expressed in 8 bits after rounding off values to the right of the decimal is 131. Hence, the difference in this case is 0.6875. The calculated value expressed in 16 bits is 131.6875, which is an error of 0, Similarly, no error is produced when expressing the value in 32 bits.

In the case of FIG. 11B shown in (b) of Table 2, the calculated value is 129.75, while the rounded value expressed sets the data size of the reduced image to the largest integer that does not exceed this product. Thus, the reduced image having the data size set at S64 is formed at S6.

In the embodiment described above, the data size of pixels in the reduced image is set greater when the reduction ratio is greater, thereby preventing deterioration in the quality of the reduced image and making it possible to set a suitable clipped range.

While the invention has been described in detail with reference to specific embodiments thereof, it would be apparent to those skilled in the art that many modifications and variations may be made therein without departing from the spirit of the invention, the scope of which is defined by the attached claims.

For example, the color system in the embodiments described above is the RGB color model, but a color system other than the RGB color model may be used. For example, the present invention may be applied to the CMY color model or the like.

In the embodiment described above, the CPU 11 provided in the printer 1 executes the image-processing program according to the present embodiment. However, this program may be provided to a personal computer as an application program that is executed by a CPU or the like provided in the personal computer.

Either the single-scale Retinex (SSR) or multi-scale Retinex (MSR) method may be used in the Retinex process.

In the embodiment described above, the reduced image size is determined based on the print mode, paper type, paper size, and original image size. However, the reduced image size may instead be determined based on one, two or three of these tour parameters.

Further, in the embodiment described above, the PC 2 sets the parameters described above via the interface 17, but these parameters may be set using the control panel 16 on the printer 1.

In the image process of the embodiments described above, the CPU 11 performs the Retinex process and the like. However, these processes may be performed with a digital signal processor (DSP). The DSP can be used to execute product-sum operations and other operations more quickly.

What is claimed is:

1. An image processing device comprising:
    an image processor operably configured to function as:
        a reduced image forming unit configured to reduce an original image having original pixels to form a reduced image having reduced pixels, a reduced image size indicated by the number of the reduced pixels being less than an original image size indicated by the number of the original pixels;
        a first reflectance value calculating unit configured to calculate a first reflectance value for each reduced pixel based on a reduced pixel value of each reduced pixel and an average value of both each reduced pixel value and pixel values of peripheral pixels of each reduced pixel;
        a normalizing parameter determining unit configured to determine a normalizing parameter based on a distribution of the first reflectance values;
        a second reflectance value calculating unit configured to calculate a second reflectance value for each original pixel based on an original pixel value of each original pixel and an average value of both each original pixel value and pixel values of peripheral pixels of each original pixel;
        a normalizing unit configured to normalize the second reflectance values based on the normalizing parameter to obtain normalized Retinex values;
        a correcting unit configured to correct the original pixel values based on the normalized Retinex values; and
        a reducing information determining unit configured to determine first information based on second information with respect to at least one of quality of the corrected original image to be formed, a type of a recording medium on which the corrected original image is formed, a size of a recording medium on which the corrected original image is formed, the reduced image size, and the original image size, the reduced image forming unit reducing the original image based on the first information.

2. The image processing device according to claim 1, further comprising a printing unit configured to print the corrected original image on the recording medium.

3. The image processing device according to claim 1, further comprising an input unit into which the second information is inputted.

4. The image processing device according to claim 1, wherein the quality of the corrected original is a resolution of the corrected original image to be formed.

5. The image processing device according to claim 1, further comprising a storing unit configured to store the first reflectance values,
    wherein the normalizing parameter determining unit determines the normalizing parameter based on the first reflectance values stored in the storing unit.

6. The image processing device according to claim 1, wherein the reducing information determining unit comprises a reduced image size determining unit configured to determine the reduced image size based on the second information.

7. The image processing device according to claim 6, wherein each reduced pixel has reduced pixel data, the reduced pixel data having a reduced data size and indicating the reduced pixel value,
    wherein the image processor further comprises a data size determining unit configured to determine the reduced data size based on a reduction ratio of the reduced image size to the original image size,
    wherein the reduced image forming unit reduces the original image so that the reduced image has the reduced data size.

8. The image processing device according to claim 7, wherein each original pixel has original pixel data, the original pixel data having an original data size and indicating the reduced pixel value,
    wherein the data size determining unit determines the reduced data size so as to be equal to or greater than the original data size.

9. The image processing device according to claim 1, wherein the reducing information determining unit further comprises a reducing algorithm determining unit configured to determine a reducing algorithm based on the second information,
    wherein the reduced image forming unit reduces the original image based on the reducing algorithm.

10. The image processing device according to claim 9, wherein the reducing algorithm determining unit selects the reducing algorithm among a plurality of reducing algorithm based on the second information.

11. An image processing method, performed by a processor, the method comprising:
    a reduced image forming step for reducing an original image having original pixels to form a reduced image having reduced pixels, a reduced image size indicated by the number of the reduced pixels being less than an original image size indicated by the number of the original pixels;
    a first reflectance value calculating step for calculating a first reflectance value for each reduced pixel based on a reduced pixel value of each reduced pixel and an average value of both each reduced pixel value and pixel values of peripheral pixels of each reduced pixel;

a normalizing parameter determining step for determining a normalizing parameter based on a distribution of the first reflectance values;

a second reflectance value calculating step for calculating a second reflectance value for each original pixel based on an original pixel value of each original pixel and an average value of both each original pixel value and pixel values of peripheral pixels of each original pixel;

a normalizing step for normalizing the second reflectance values based on the normalizing parameter to obtain normalized Retinex values;

a correcting step for correcting the original pixel values based on the normalized Retinex values; and a reducing information determining step for determining, before the reduced image forming step, first information based on second information with respect to at least one of quality of the corrected original image to be formed, a type of a recording medium on which the corrected original image is formed, a size of a recording medium on which the corrected original image is formed, the reduced image size, and the original image size, the reduced image forming step reducing the original image based on the first information.

12. The image processing method according to claim 11, wherein the reducing information determining step comprises a reduced image size determining step for determine the reduced image size based on the second information.

13. The image processing method according to claim 12, wherein each reduced pixel has reduced pixel data, the reduced pixel data having a reduced data size and indicating the reduced pixel value, wherein the image processing method further comprising a data size determining step for determining, after the reduced image size determining step and before the reduced image forming step, the reduced data size based on a reduction ratio of the reduced image size to the original image size, wherein the reduced image forming step reduces the original image so that the reduced image has the reduced data size.

14. The image processing method according to claim 13, wherein each original pixel has original pixel data, the original pixel data having an original data size and indicating the reduced pixel value, wherein the data size determining step determines the reduced data size so as to be equal to or greater than the original data size.

15. The image processing method according to claim 11, wherein the reducing information determining step further comprises a reducing algorithm determining step for determining, before the reduced image forming step, a reducing algorithm based on the second information, wherein the reduced image forming step reduces the original image based on the reducing algorithm.

16. The image processing method according to claim 15, wherein the reducing algorithm determining step selects the reducing algorithm among a plurality of reducing algorithm based on the second information.

17. A non-transitory storage medium storing a set of program instructions executable on an image processor, the set of program instructions comprising:

a reduced image forming step for reducing an original image having original pixels to form a reduced image having reduced pixels, a reduced image size indicated by the number of the reduced pixels being less than an original image size indicated by the number of the original pixels;

a first reflectance value calculating step for calculating a first reflectance value for each reduced pixel based on a reduced pixel value of each reduced pixel and an average value of both each reduced pixel value and pixel values of peripheral pixels of each reduced pixel;

a normalizing parameter determining step for determining a normalizing parameter based on a distribution of the first reflectance values;

a second reflectance value calculating step for calculating a second reflectance value for each original pixel based on an original pixel value of each original pixel and an average value of both each original pixel value and pixel values of peripheral pixels of each original pixel;

a normalizing step for normalizing the second reflectance values based on the normalizing parameter to obtain normalized Retinex values;

a correcting step for correcting the original pixel values based on the normalized Retinex values; and a reducing information determining step for determining, before the reduced image forming step, first information based on second information with respect to at least one of quality of the corrected original image to be formed, a type of a recording medium on which the corrected original image is formed, a size of a recording medium on which the corrected original image is formed, the reduced image size, and the original image size, the reduced image forming step reducing the original image based on the first information.

18. The non-transitory storage medium according to claim 17, wherein the reducing information determining step comprises a reduced image size determining step for determine the reduced image size based on the second information.

19. The non-transitory storage medium according to claim 18, wherein each reduced pixel has reduced pixel data, the reduced pixel data having a reduced data size and indicating the reduced pixel value, wherein the image processing method further comprising a data size determining step for determining, after the reduced image size determining step and before the reduced image forming step, the reduced data size based on a reduction ratio of the reduced image size to the original image size, wherein the reduced image forming step reduces the original image so that the reduced image has the reduced data size.

20. The non-transitory storage medium according to claim 19, wherein each original pixel has original pixel data, the original pixel data having an original data size and indicating the reduced pixel value, wherein the data size determining step determines the reduced data size so as to be equal to or greater than the original data size.

21. The non-transitory storage medium according to claim 17, wherein the reducing information determining step further comprises a reducing algorithm determining step for determining, before the reduced image forming step, a reducing algorithm based on the second information, wherein the reduced image forming step reduces the original image based on the reducing algorithm.

22. The non-transitory storage medium according to claim 21, wherein the reducing algorithm determining step selects the reducing algorithm among a plurality of reducing algorithm based on the second information.

23. An image processing device comprising:
an image processor operably configured to function as:
- a reduced image forming unit configured to reduce an original image having original pixels to form a reduced image having reduced pixels, a reduced image size indicated by the number of the reduced pixels being less than an original image size indicated by the number of the original pixels, each reduced pixel having reduced pixel data, the reduced pixel data having a reduced data size and indicating the reduced pixel value;
- a first reflectance value calculating unit configured to calculate a first reflectance value for each reduced pixel based on a reduced pixel value of each reduced pixel and an average value of both each reduced pixel value and pixel values of peripheral pixels of each reduced pixel;
- a normalizing parameter determining unit configured to determine a normalizing parameter based on a distribution of the first reflectance values;
- a second reflectance value calculating unit configured to calculate a second reflectance value for each original pixel based on an original pixel value of each original pixel and an average value of both each original pixel value and pixel values of peripheral pixels of each original pixel;
- a normalizing unit configured to normalize the second reflectance values based on the normalizing parameter to obtain normalized Retinex values;
- a correcting unit configured to correct the original pixel values based on the normalized Retinex values; and
- a data size determining unit configured to determine the reduced data size based on a reduction ratio of the reduced image size to the original image size, the reduced image forming unit reducing the original image based on a reducing algorithm.

* * * * *